United States Patent
Bates et al.

(10) Patent No.: US 7,823,774 B2
(45) Date of Patent: Nov. 2, 2010

(54) METHOD, APPARATUS, AND ARTICLE OF MANUFACTURE FOR AUTOMATIC VERIFICATION OF TRANSACTIONS MADE OVER AN INSECURE NETWORK

(75) Inventors: Cary Lee Bates, Rochester, MN (US); Jason J. Illg, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/691,188

(22) Filed: Mar. 26, 2007

(65) Prior Publication Data

US 2008/0237336 A1    Oct. 2, 2008

(51) Int. Cl.
*G06K 5/00* (2006.01)

(52) U.S. Cl. ............... 235/380; 235/375; 235/379; 235/382; 235/383; 705/26; 705/39; 705/64; 705/75

(58) Field of Classification Search .......... 235/380, 235/375, 379, 382, 383; 705/26, 39, 75, 705/64
See application file for complete search history.

(56) References Cited

U.S. PATENT DOCUMENTS

| | | | |
|---|---|---|---|
| 6,639,975 B1 | 10/2003 | O'Neal et al. | |
| 6,834,271 B1* | 12/2004 | Hodgson et al. | 705/72 |
| 7,083,085 B1 | 8/2006 | Daniels et al. | |
| 2001/0051917 A1* | 12/2001 | Bissonette et al. | 705/39 |
| 2001/0056409 A1* | 12/2001 | Bellovin et al. | 705/64 |
| 2003/0069858 A1 | 4/2003 | Kittlitz et al. | |
| 2004/0039775 A1* | 2/2004 | Yoshida et al. | 709/203 |
| 2004/0128256 A1 | 7/2004 | Krouse et al. | |
| 2004/0133487 A1 | 7/2004 | Hanagan et al. | |
| 2004/0139004 A1* | 7/2004 | Cohen et al. | 705/39 |
| 2004/0254848 A1* | 12/2004 | Golan et al. | 705/26 |
| 2006/0015458 A1* | 1/2006 | Teicher | 705/40 |
| 2006/0122899 A1* | 6/2006 | Lee et al. | 705/26 |

(Continued)

FOREIGN PATENT DOCUMENTS

WO         0169549 A1      9/2001

OTHER PUBLICATIONS https://www.paypal.com/IntegrationCenter/ic_direct-payment.html, "Direct Payment", pp. 1-4.

(Continued)

*Primary Examiner*—Michael G Lee
*Assistant Examiner*—Ali Sharifzada
(74) *Attorney, Agent, or Firm*—Martin & Associates, LLC; Bret J. Petersen (57) ABSTRACT

An apparatus and method automatically verifies online transactions, such as credit card charges, made by a customer of a bank or financial institution. A browser "plug-in" is used to monitor a first party use of the internet to detect online transactions and create transaction data. The transaction data is forwarded to the financial institution to correlate with transaction data received independently from the other party in the transaction. The financial institution can provide the customer with alerts, such as online purchase warnings, if there are problems or discrepancies between the data from the first party and the data provided by the second party. The transaction data can also be used in other ways to provide information to the financial institution's customers.

6 Claims, 5 Drawing Sheets

U.S. PATENT DOCUMENTS

2007/0143227 A1* 6/2007 Kranzley et al. .............. 705/67

OTHER PUBLICATIONS

Lisa Thomason, "HTML Tip: Avoid Duplicate Form Submissions", pp. 1-4.

http://www.intellipay.com/Reports/FeaturesDigest.htm, "Intellipay Features & Benefits Digest", pp. 1-6.

IBM Research Disclosure, "Browser Cookies which Help Web Servers Alert Users of Potential Security Violations", Aug. 2001, p. 1422.

http://usa.visa.com/personal/security/visa_security_program/vbv/how_. . . , "Verified by Visa, How it Works", pp. 1-2.

* cited by examiner

METHOD, APPARATUS, AND ARTICLE OF MANUFACTURE FOR AUTOMATIC VERIFICATION OF TRANSACTIONS MADE OVER AN INSECURE NETWORK

BACKGROUND

1. Technical Field

This invention generally relates to internet purchase transactions, and more specifically relates to an apparatus and method for a bank or other financial institution to automatically verify internet credit card charges made by the bank's customers over the internet.

2. Background Art

As internet commerce continues to grow, online purchases are becoming an increasingly larger part of credit card transactions. Many credit card holders feel uncomfortable using their credit card for an online purchase. They may be worried about security of the transaction or they may be concerned about the proper accounting of the transaction. Credit card companies continue to seek ways to prevent fraud and provide peace of mind to their customers. Past methods for added security and peace of mind include monitoring customers cards for unusual activity and providing indemnity of the cardholder for fraud. Despite these prior art methods, there is ample room for other services that the credit card issuers could provide to increase confidence in online purchases.

One area of concern for credit card customers is verification of online purchases. A customer often makes many purchases during a single month using a credit card. Upon receipt of the monthly credit card bill, the customer is faced with remembering a large number of purchases to try to reconcile the bill. Further, sometimes the line items on the bill do not adequately identify the online source of the purchases in a way that is recognizable by the consumer. Faced with the daunting task of verification of these obscure charges, the consumer may often resort to just a cursory check before paying the bill.

Without a way to more effectively verify the charges on a credit card bill, consumers will continue to suffer from inadequate verification of credit card charges and concern for the security of internet transactions. These concerns will adversely affect the credit card company's ability to compete in the market of online transactions.

BRIEF SUMMARY

An apparatus and method is described to automatically verify online credit card charges. The credit card verification system described herein is directed towards verification of an online purchase made by a customer of a bank or financial institution using a credit card. A browser "plug-in" is used to monitor the credit card customer's use of the internet to detect online purchases and create credit card purchase data. The credit card purchase data is forwarded to the credit card company to correlate with credit card transaction data from the retailer in the transaction with the credit card customer. The credit card company can provide the customer with online purchase warnings if there are problems or discrepancies between the credit card purchase data from the browser plug-in and the data provided by the retailer in the credit card transaction. The credit card purchase data can also be used in other ways to provide information to the credit card customer.

The description and claims herein are directed to a generic computer architecture and thus could be implemented on any browser computer system and any computer system used by credit card companies to process customer charges and generate customer bills.

The foregoing and other features and advantages will be apparent from the following more particular description, as illustrated in the accompanying drawings.

BRIEF DESCRIPTION OF DRAWINGS

The disclosure will be described in conjunction with the appended drawings, where like designations denote like elements, and.

DETAILED DESCRIPTION

The disclosure and claims herein are directed to an apparatus and method to automatically verify online credit card charges made by a customer of a bank or financial institution. A browser "plug-in" or a special browser may be used to monitor the credit card customer's use of the internet to detect online purchases. Credit card purchase data from the online purchase is forwarded to the credit card company to correlate with credit card transaction data from the vendor or retailer. The credit card company can then provide the customer with online purchase notations if there are problems or discrepancies between the credit card purchase data and the data provided by the retailer. The special browser or plug-in operates on the customer's computer. The operations at the credit card company would be performed on a similar computer or a much larger computer. For simplicity herein, the two operations are described as being performed on a similar computer system.

Figure 1:
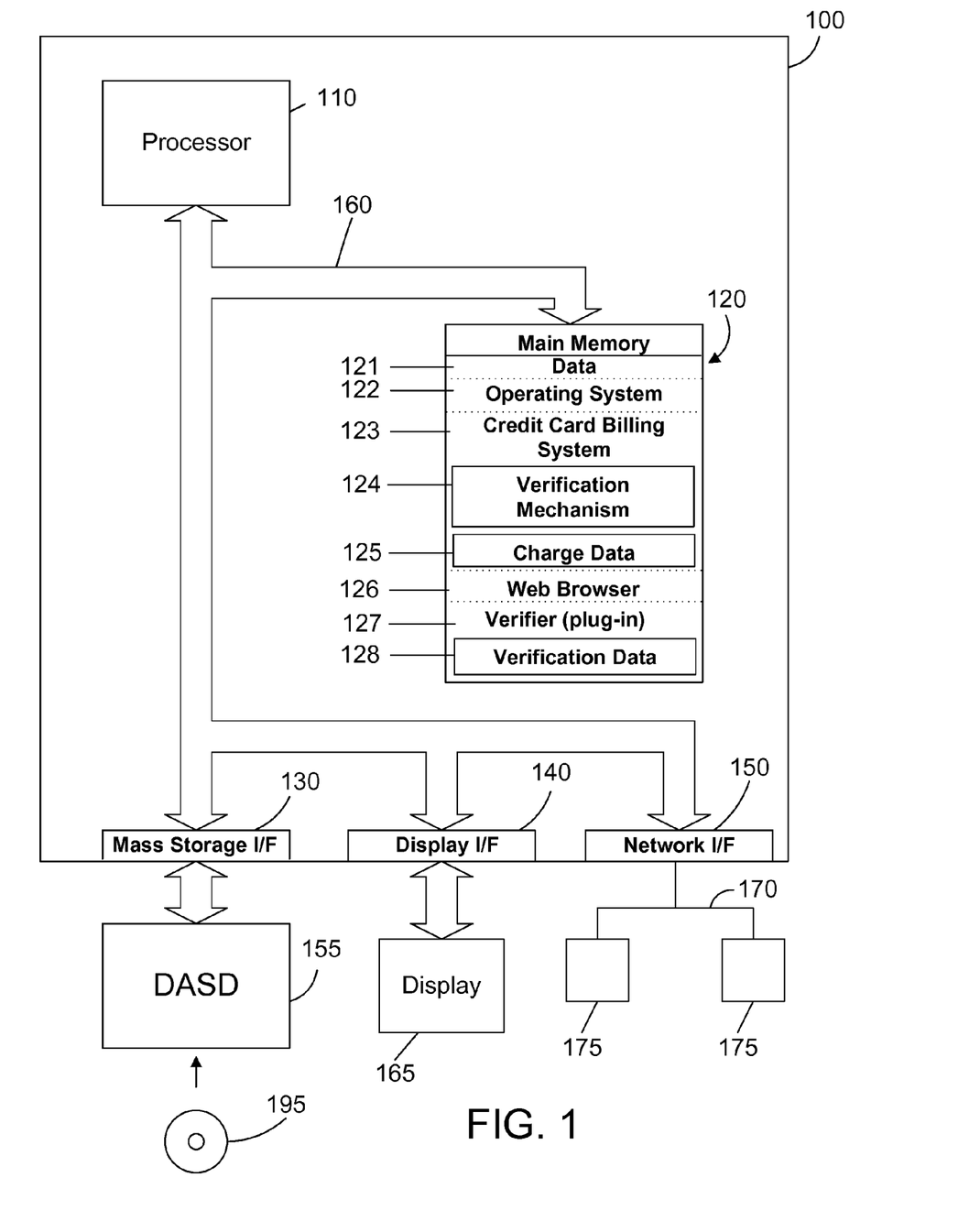
FIG. 1 is a block diagram of a computer system with a credit card verifier as described herein.

Referring to FIG. 1, a computer system 100 is one suitable implementation of the apparatus and method described herein. Computer system 100 is an IBM eServer System i computer system. However, those skilled in the art will appreciate that the methods and apparatus described herein apply equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 contains data 121, an operating system 122, a credit card billing system 123, verification mechanism 124, charge data 125, a web browser 126, a credit card verifier 127 and credit card verification data 128. Data 121 represents any data that serves as input to or output from any program in computer system 100. Operating system 122 is a multitasking operating system known in the industry as i5/OS; however, those skilled in the art will appreciate that the spirit and scope of this disclosure and claims are not limited to any one operating system. The main memory 120 shown includes the memory elements that actually reside on two computer systems, the credit card customer's computer and the credit card company's computer as described above. The web browser 126 and the credit card verifier 127 reside only on the customer's computer and they function to create the credit card verification data 128 that is forwarded to the credit card billing system 123 on the credit card company's computer. The credit card billing system 123, the verification mechanism 124, the charge data 125, the web browser 126, the credit card verifier 127 and credit card verification data 128 are each described in more detail in the paragraphs below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and the other memory elements discussed above are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that the credit card verifier described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that the credit card verifier described herein applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The credit card verification system described herein applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the credit card verification system has been and will continue to be described in the context of a fully functional computer system, those skilled in the art will appreciate that the credit card verifier described herein is capable of being distributed as an article of manufacture in a variety of forms, and that the claims extend to all types of computer-readable media used to actually carry out the distribution. Examples of suitable computer-readable media include: recordable media such as floppy disks and CD-RW (e.g., 195 of FIG. 1).

Figure 2:
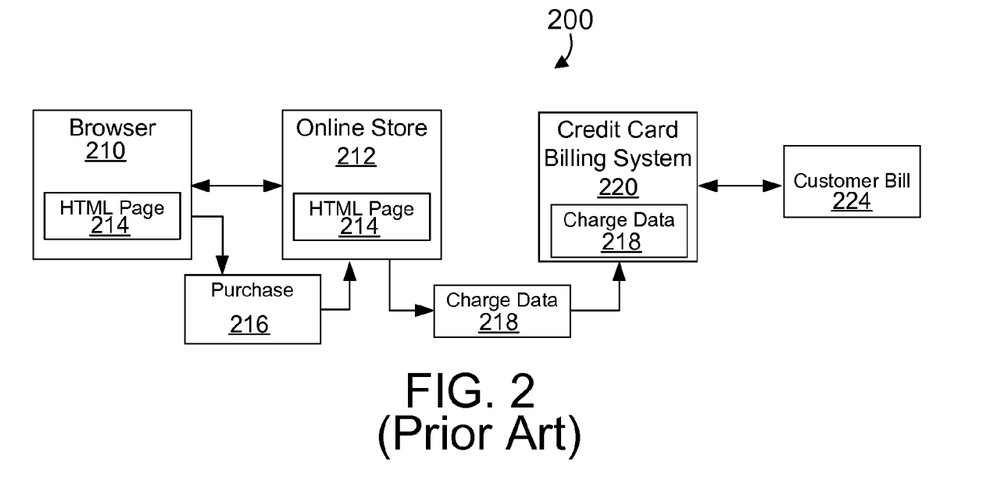
FIG. 2 is a block diagram of an online credit card transaction according to the prior art.

FIG. 2 illustrates a block diagram 200 of an online credit card transaction according to the prior art. A customer of a credit card company uses a browser 210 to access a retailer's online store 212 and download an HTML page 214 from the retailer's website to the customer's computer with the browser 210. The customer uses the browser 210 and the HTML page 214 to make a purchase from the retailer. The browser creates a purchase file 216 that is sent to the retailer's online store 212 to initiate the purchase by the customer. In response to the credit card purchase by the customer, the retailer sends charge data 218 to the credit card company. The charge data 218 is loaded into the credit card billing system 220 on the credit card company's computer (100 in FIG. 1). The charge data includes information concerning the charge transaction by the credit card customer. The credit card billing system processes the charge data to create a bill to each customer 224.

Figure 3:
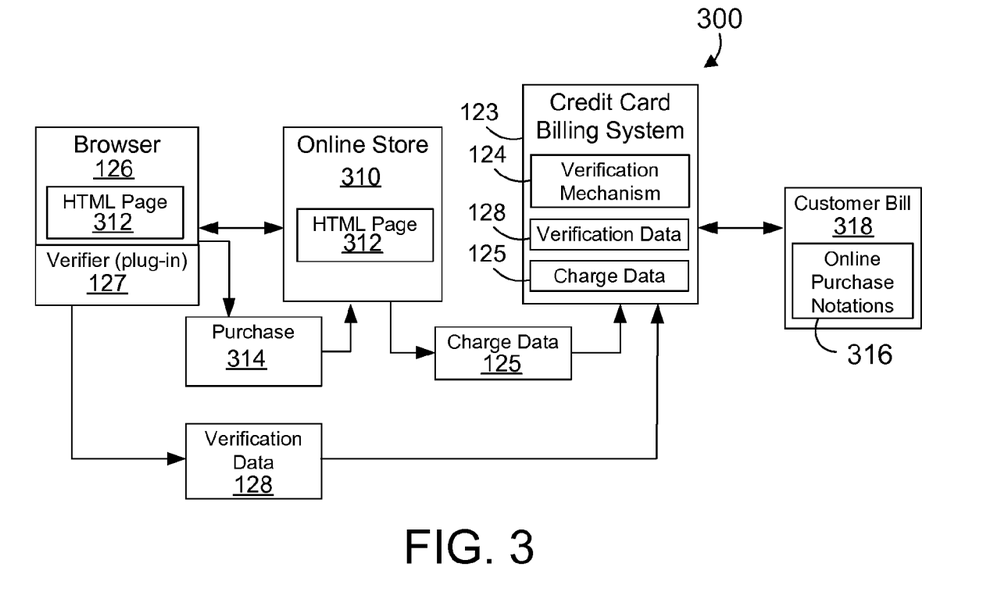
FIG. 3 illustrates a block diagram of a credit card verification system to process an online credit card transaction as claimed herein.

FIG. 3 illustrates a block diagram of a credit card verification system 300 to process an online credit card transaction as claimed herein. The process as seen by the credit card customer and the retailer is the same as described in the prior art above. The customer of a credit card company uses a browser 126 to access a vendor or retailer's online store 310 and download an HTML page 312 from the retailer's website to the customers computer with the browser 126. The customer uses the browser 126 and the HTML page 312 to make a purchase from the retailer. The browser 126 creates a purchase file 314 that is sent to the retailer's online store 310 to initiate the purchase by the customer. In response to the credit card purchase by the customer, the retailer's online store 310 sends charge data 125 to the credit card company. The charge data 125 is loaded into the credit card company's credit card billing system 123. The credit card company then processes the charge transactions to create a customer bill 318 for each customer as described further below.

Again referring to FIG. 3, a verifier 127 is implemented with the browser to verify credit card transactions as described further herein. The verifier 127 may be a browser that incorporates the verifier functions, or the verifier may be implemented as a plug-in that works in conjunction with an existing browser. The verifier 127 monitors events on the browser such as HTML pages accessed by the credit card customer to determine when an online purchase results in posting a credit card transaction to the online store. When the verifier 127 determines a credit card transaction has been performed, the verifier extracts verification data 128 concerning the transaction and sends the verification data 128 to the credit card billing system 123 of the credit card company. The verification mechanism 124 on the credit card billing system 123 verifies the charge data 125 from the online store 310 against the verification data 128 from the verifier 127 to determine if there are problems or discrepancies to alert the customer with online purchase notations 316 on the customers' bill 318 as described further below.

Again referring to FIG. 3, the operation of the verifier will be described further. The verifier may be a plug-in supplied by the credit card company or a specially modified browser that incorporates the verifier function as described herein. The verifier plugin monitors events that occur on the browser. The verifier plugin is notified each time an event occurs for which the verifier plugin is registered with the browser. For example, the verifier plugin could be registered to be notified for any HTML event. Thus, when notified, the verifier looks at each event for user input posted to the internet such as information entered into HTML forms. Specifically, the verifier looks for strings that contain credit card numbers.

When the verifier finds a credit card number for a supported credit card in a posted event, it saves the web page and the time the credit card number was submitted. The verifier also parses the web page with the credit card number for the total and subtotal to be charged. If the totals are not found on this web page, the verifier can also parse preceding and subsequent pages to find the totals. The web page information and totals are forwarded to the credit card company as the verification data 128. The verification data 128 could also include a copy of the exact web page presented to the user to be used by the credit card company for verification purposes such as if a complaint is filed.

Again referring to FIG. 3, as introduced above, the verification mechanism 124 verifies the charge data 125 from the online store 310 against the verification data 128 from the verifier 127. The verification mechanism 124 attempts to associate any credit card charges from the verification data 128 with charges from the online store 310 in the charge data 125. The customer's bill 318 can be flagged with online purchase notations 316 to give the customer information about online charges. The online purchase notations 316 could include warnings if there does not seem to be a match between the verification data 128 and the charge data 125. The warnings could be flagged on the bill in any suitable manner to draw the customers attention to check the potential problem with the online purchase. If no totals were found to associate the data, the online purchase notations could indicate no verification was made but notate a possible online transaction occurred.

Alternatively, if the credit card vendors with online stores were to provide charge data 125 that indicated a purchase is an online purchase, the online purchase notations 316 could also flag sales that were from an online store but there is no corresponding verification data. This online purchase notation could warn the customer to check a questionable charge since the verification could not be done. While the sale may have been done by the customer from another computer, it may also be a fraudulent charge that the customer can be alerted to check.

The online purchase notations described above could also provide another benefit to the credit card customer. In the prior art, the description of credit card transactions on a customers bill sometimes does not clearly indicate the source of the transaction. The description may give the source of the credit card transaction by the name of a parent company which does not match the name of the online store. The online verification data allows the credit card company to include the name of the online store in the online purchase notations 316 on the customer's bill 318. This allows the credit card customer to more readily recognize and remember the purchase that may have been made several weeks earlier.

Figure 4:
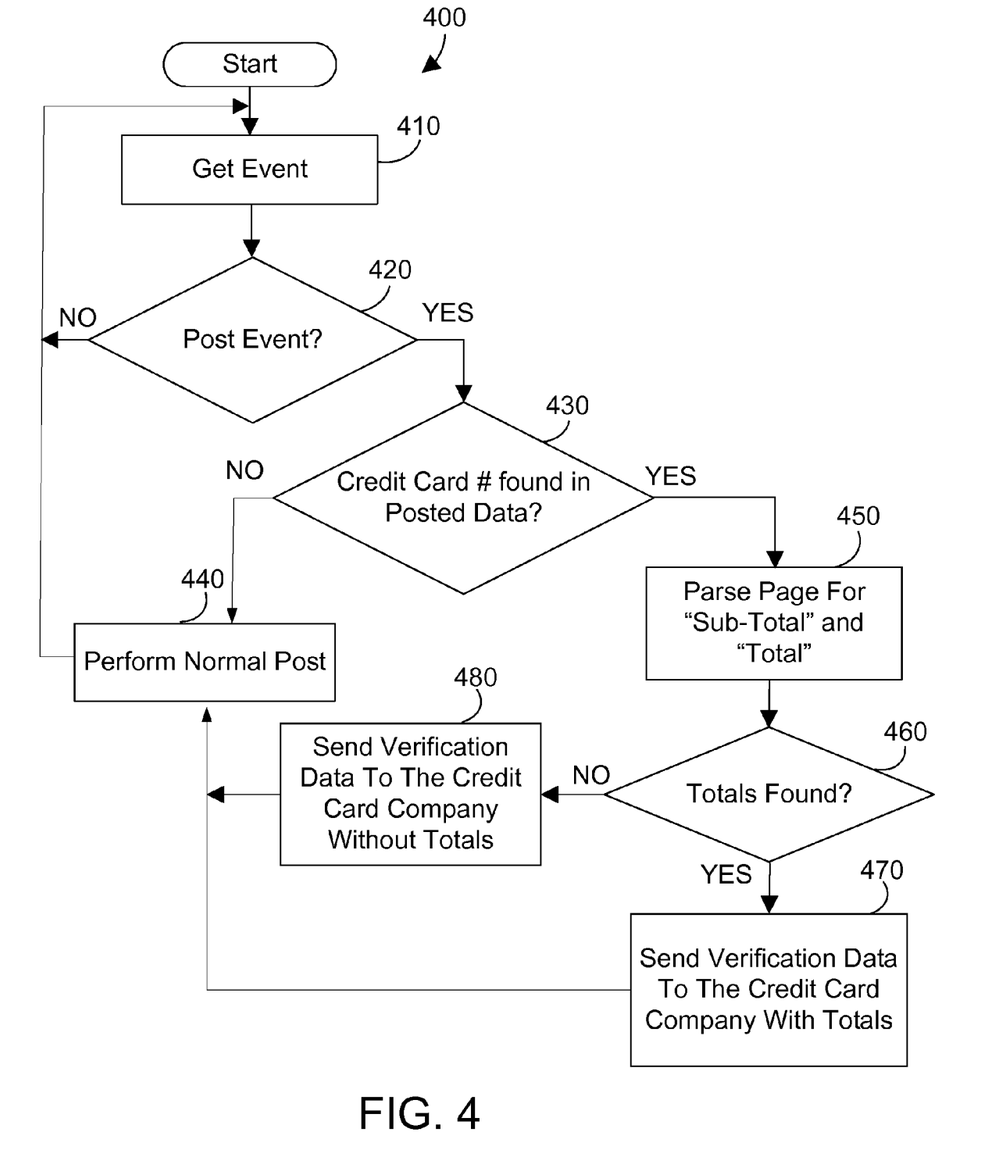
FIG. 4 is a method flow diagram for collecting online purchase data to verify credit card purchases.

FIG. 4 illustrates a method 400 for collecting online purchase data to verify credit card purchases. This method operates on a credit card customer's computer system 100 described above with reference to FIG. 1. The method 400 monitors each event that happens on the browser that could perform a credit card transaction such as a post event that posts an HTML page to a remote computer on the internet. The method 400 gets the current event (step 410). If the event is not a post event (step 420=no) then return to step 410. If the event is a post event (step 420=yes), and there is no credit card number in the posted data (step 430=no) then perform a normal post (step 440). After step 440 then return to step 410. If the event is a post event (step 420=yes), and there is a credit card number in the posted data (step 430=yes) then parse the page for "sub-total" and "total" to find a credit card transaction (step 450). If totals are found (step 460=yes) then send the card number and the transaction details to the credit card company (step 470), perform a normal post (step 440) and then the continue by looping back to step 410. If totals are not found (step 460=no) then send the card number to the credit card company without totals (step 480) and go to (step 440).

Figure 5:
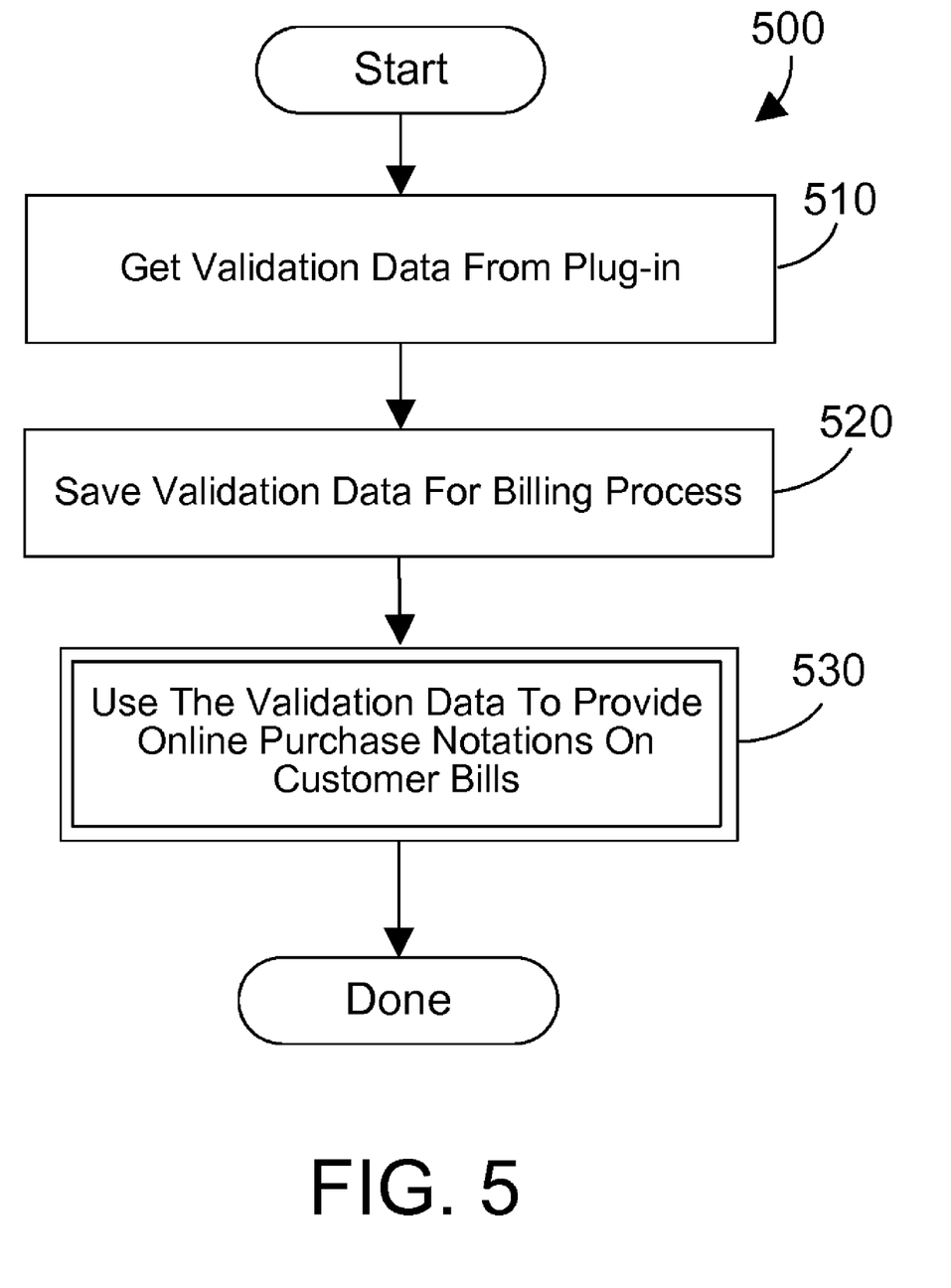
FIG. 5 is a method flow diagram for validating online purchase data to verify credit card purchases.

FIG. 5 illustrates a method 500 for validating online purchase data to verify credit card purchases. This method operates on a credit card company's computer system 100 described above with reference to FIG. 1. First get the validation data from the browser or browser plug-in (step 510). Then save the validation data for the billing process (step 520). Then use the validation data to provide online purchase notations on customer bills (step 530). The method is then done.

Figure 6:
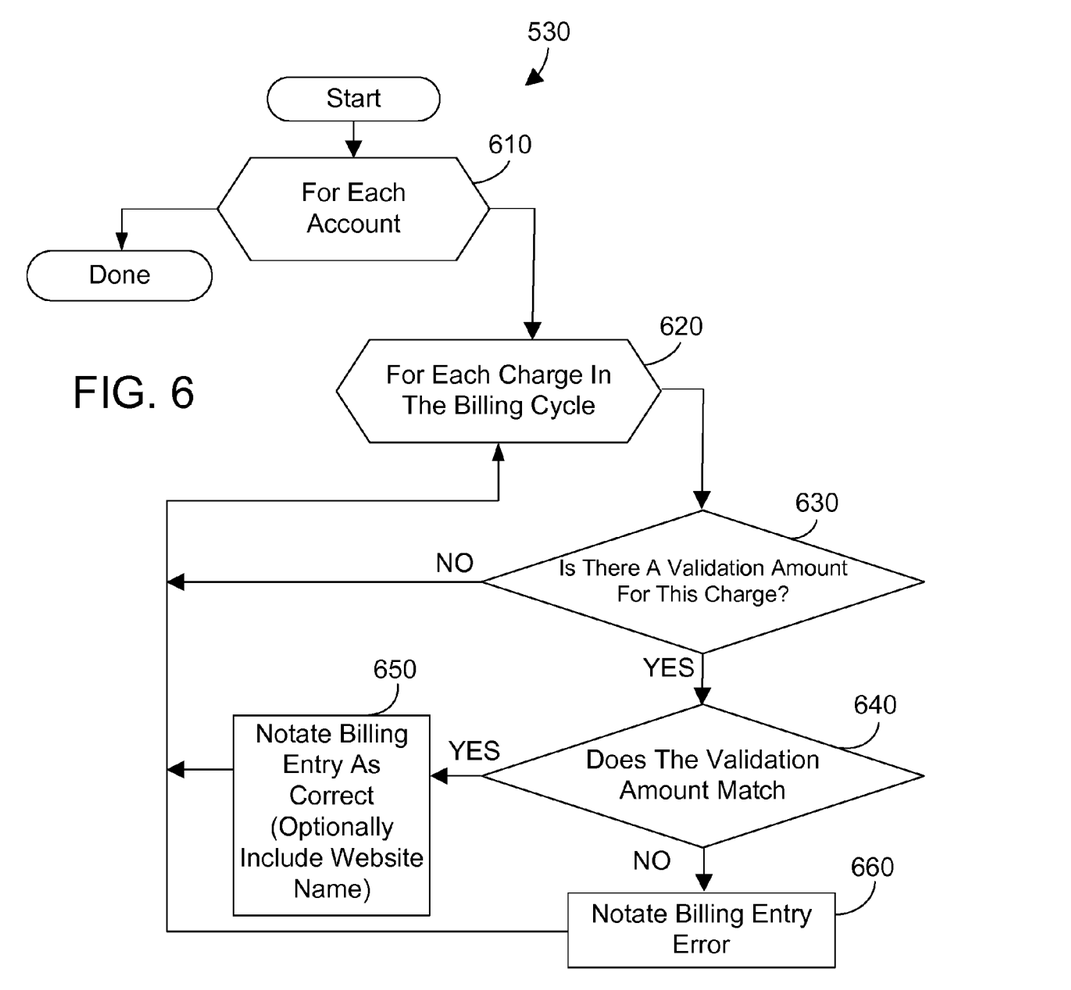
FIG. 6 is a method flow diagram that represents one possible implementation for step 530 shown in FIG. 5.

The method 530 illustrated in FIG. 6 represents one suitable implementation for the step 530 described above with reference to FIG. 5. According to method 530, for each credit card account of the bank or financial institution (step 610) perform the following method steps to verify the online billing charges until all the accounts have been verified and then the method is done. Further, for each charge in the billing cycle perform the following steps (step 620). If there is a validation amount for the current charge (step 630=yes) then go to step 640. If there is not a validation amount for the current charge (step 630=no) then go to the next charge in step 620. If the validation amount matches the corresponding charge in the charge data (step 640=yes) then notate the billing entry is correct on the bill (step 650) and return to step 620. Step 650 includes the optional of including the website name on the customer's bill. If the validation amount does not match a corresponding charge in the charge data (step 640=no) then notate a billing error or warning on the bill (step 660) and return to step 620.

The disclosure herein describes a method and apparatus to automatically verify online credit card charges made by a customer of a bank or financial institution with a browser "plug-in" or a special browser that may be used to monitor the credit card customer's use of the internet to make online purchases. This verification of charges will help alleviate customer concerns regarding the security of internet transactions and help the credit card companies compete in the market of online transactions.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. A computer implemented method for verifying online credit card purchases comprising the steps of:

retrieving an event from an internet browser used by a credit card customer;

where the event is a post event of a credit card transaction to an online store, parsing the event for a credit card number;

where a credit card number is found, sending verification data from the internet browser directly to a credit card company that is the issuer of the credit card number;

getting validation data from a plug-in in the internet browser;

saving the validation data for a billing process; and using the validation data to provide online purchase notations on a customer's bill sent to the credit card customer; and wherein the step of using the validation data to provide online purchase notations on a customer's bill includes the steps of:

processing each customer's account and considering each charge in a billing cycle from charge data provided by a vendor to find a corresponding amount in the validation data; and where there is a corresponding amount match in the validation data, notating on the customer's bill that the billing entry is correct and validated.

2. A computer implemented method for verifying online credit card purchases comprising the steps of:

retrieving an event from an internet browser used by a credit card customer;

where the event is a post event of a credit card transaction to an online store, parsing the event for a credit card number;

where a credit card number is found, sending verification data from the internet browser directly to a credit card company that is the issuer of the credit card number;

getting validation data from a plug-in in the internet browser;

saving the validation data for a billing process; and using the validation data to provide online purchase notations on a customer's bill sent to the credit card customer; and wherein the step of using the validation data to provide online purchase notations on a customer's bill includes the steps of:

processing each customer's account and considering each charge in a billing cycle from charge data provided by a vendor to find a corresponding amount in the validation data; and where there is no corresponding amount in the validation data, notating on the customer's bill that no verification was made but a possible online transaction occurred.

3. A computer implemented method for verifying online credit card purchases comprising the steps of:

receiving validation data for a credit card number from an event from an internet browser of a customer directly to a credit card company that is the issuer of the credit card number; where the event is a post event of a credit card transaction by the customer to an online store and the validation data includes information from the credit card transaction;

using the validation data to provide online purchase notations on a bill from the credit card company to the customer by performing the steps of:

considering each charge in a billing cycle for the customer from charge data provided by a vendor to find a corresponding amount in the validation data; and where there is a corresponding amount match in the validation data, notating on the bill for the customer that the billing entry is correct and validated.

4. The computer implemented method of claim 3 wherein the step of notating on the bill for the customer that the billing entry is correct and validated includes indicating on the bill for the customer the name of the online store where the credit card transaction was made.

5. The computer implemented method of claim 3 wherein the step of using the validation data to provide online purchase notations on a bill from the credit card company to a customer further includes the steps of:

considering each charge in a billing cycle for the customer from charge data provided by a vendor to find a corresponding amount in the validation data; and where there is no corresponding amount in the validation data, notating on the bill for the customer that no verification was made but a possible online transaction occurred.

6. The computer implemented method of claim 3 wherein the step of using the validation data to provide online purchase notations on a bill from the credit card company to the customer includes the steps of:

the vendor providing an indication in charge data provided by the vendor and sent to the credit card company that a charge is from an online purchase;

considering each charge in a billing cycle for the customer from the charge data to find a corresponding amount in the validation data; and where there is no corresponding amount in the validation data, notating on the bill for the customer a potential fraudulent charge.

* * * * *